(12) United States Patent
Shi et al.

(10) Patent No.: US 8,294,718 B2
(45) Date of Patent: *Oct. 23, 2012

(54) SYSTEMS AND METHODS FOR COMPUTING A VARIOGRAM MODEL

(75) Inventors: Genbao Shi, Sugar Land, TX (US); Richard L Chambers, Bixby, OK (US); Jeffrey M Yarus, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,099

(22) Filed: Jun. 27, 2011

(65) Prior Publication Data

US 2011/0316883 A1 Dec. 29, 2011

Related U.S. Application Data

(63) Continuation of application No. 12/229,879, filed on Aug. 27, 2008, now Pat. No. 8,009,170.

(60) Provisional application No. 60/968,289, filed on Aug. 27, 2007.

(51) Int. Cl.
*G06T 11/20* (2006.01)
(52) U.S. Cl. .......................... 345/440; 703/6
(58) Field of Classification Search .................. 345/440; 703/6
See application file for complete search history.

(56) References Cited

U.S. PATENT DOCUMENTS

| 6,865,582 | B2* | 3/2005 | Obradovic et al. ................ 1/1 |
| 2002/0019728 | A1* | 2/2002 | Van Bemmel et al. ........... 703/2 |
| 2007/0265813 | A1* | 11/2007 | Unal et al. ....................... 703/2 |
| 2009/0110242 | A1* | 4/2009 | Touati et al. .................. 382/109 |

OTHER PUBLICATIONS

Drew et al., Validation of the Relation between Structural patterns in fractured bedrock and structural infromation interpreted from 2D-variogram maps of water-well yields in Loundon County, Virginia, Natural Resources Research, vol. 13, No. 4, Dec. 2004 pp. 255-264.*

The International Search Report and the Written Opinion of the International Searching Authority, PCT/US09/62042, Dec. 15, 2009, 8 pages.

Deutsch, C.V.; Geostatistical Reservoir Modeling; Applied Geostatistics Series; pp. 131-152; University Press; New York; 2002.

Wingle, C.V., Poeter, E.P. and McKenna, S.A.; UNCERT User's Guide: A Geostatistical Uncertainty Analysis Package Applied to Groundwater Flow and Contaminant Transport Modeling, Chapter 9 "Model Semivariogram: Variofit"; pp. 149-196; http://www.uncert.com/; 1995.

Isaaks, E.H. and Srivastava, R.M.; An Introduction to Applied Geostatistics; pp. 368-387, 390-391, 534-535; Oxford University Press; Oxford; 1989.

Qi Chen, Peng Gong; "Automatic Variogram Parameter Extraction for Textural Classification of the Panchromatic IKONOS Imagery" pp. 1106-1115; IEEE Transactions on Geosicience and Remote Sensing, vol. 42, Issue 5, May 2004.

(Continued)

*Primary Examiner* — M Good Johnson
(74) *Attorney, Agent, or Firm* — Crain Caton & James

(57) ABSTRACT

Systems and methods for computing a variogram model, which utilize a variogram map and a rose diagram to compute the model.

27 Claims, 6 Drawing Sheets
(4 of 6 Drawing Sheet(s) Filed in Color)

OTHER PUBLICATIONS

Spatial Analysis and Decision Assistance (SADA) Version 4.1—User Guide, May 2005. [XP002561553] [retrieved by the EPO from the Internet on Dec. 22, 2009] Retrieved from: <http://www.tiem.utk.edu/~sadaiSADA_4_1_Usersguide.pdf>, pp. 1, 90-97.

The International Search Report and the Written Opinion of the International Searching Authority, PCT/US2008/074510, Jan. 7, 2010, 12 pages.

Article 34 Amendment and Response, PCT/US08/74510, Apr. 13, 2010, 7 pages.

Wang, Andrew, International Preliminary Examination Report; Mar. 9, 2011; 9 pgs.; Commissioner for Patents; Alexandria, VA.

Sahin, et al.; Geological Controls of Variograms in a Complex Carbonate Reservoic; Mathematical Geology, vol. 30, No. 3; 1998; pp. 309-322; Eastern Province, Saudi Arabia.

Wu, Yuanyuan; Chinese First Office Action—Application No. 200880105034.X; Aug. 10, 2011; 5 pgs.; The State Intellectual Property Office (SIPO); Haidian, Beijing.

Wu Yuanyuan, Second Notification of Office Action, Application No. 200880105034.X, May 14, 2012, 6 pages, The State Intellectual Property Office of China, China.

Wang Ying Cynthia, Statement of Opinions in Response to the Second Office Action, Application No. 200880105034.X, Jul. 30, 2012, 5 pages, CN-Knowhow Intellectual Property Agent Limited, Beijing.

\* cited by examiner

SYSTEMS AND METHODS FOR COMPUTING A VARIOGRAM MODEL

CROSS-REFERENCE TO RELATED APPLICATIONS

This application is a continuation of U.S. patent application Ser. No. 12/229,879, filed on Aug. 27, 2008, which is hereby incorporated by reference. U.S. patent application Ser. No. 12/229,879 claims the priority of U.S. patent application Ser. No. 60/968,289, filed on Aug. 27, 2007, which is incorporated herein by reference. Applicants therefore, claim priority based on the filing date of U.S. patent application Ser. No. 60/968,289. This application and U.S. patent application Ser. No. 12/605,945, which is incorporated herein by reference, are commonly assigned to Landmark Graphics Corporation.

STATEMENT REGARDING FEDERALLY SPONSORED RESEARCH

Not applicable.

FIELD OF THE INVENTION

The present invention generally relates to computing a variogram model for geostatistics/property modeling.

BACKGROUND OF THE INVENTION

Finding a variogram model is one of most important and often difficult tasks in geostatistics/property modeling as it identifies the maximum and minimum directions of continuity of a given geologic or petrophysical property or any spatially correlated property. The "maximum direction of continuity" is the azimuth along which the variance of a given property changes the least. The "minimum direction of continuity" is a direction perpendicular to the maximum direction of continuity, which is the azimuth along which the variance of a given property changes the most.

Conventional methods for the computation and fitting of a traditional semi-variogram often require domain expertise on the part of the user and considerable trial and error.

Conventional methods for automated semi-variogram fitting also focus on least squares methods of fitting a curve to a set of points representing an experimental semi-variogram.

Many commercial software packages offer traditional trial and error fitting. In FIG. 1, for example, traditional trial and error semi-variogram modeling is illustrated using ten (10) experimental semi-variograms in a graphical user interface 100. Each experimental semi-variogram is computed along a different azimuth. The number of experimental semi-variograms is dependent on the number of input data points and the number of data pairs in the computation. Ten were chosen for this example and produced satisfactory results based on 261 input data points. The user must experiment with the number of direction, with a minimum of 2 and a maximum of 36; the latter of which is computed every 5 degrees.

In each semi-variogram illustrated in FIG. 1, the user drags a vertical line 102 (left or right) using a pointing device until a line 104 is a "best fit" between the points in each semi-variogram. The user also has a choice of model types such as, for example, spherical, exponential, and Gaussian, when fitting the experimental semi-variogram points. This type of non-linear fitting is available in commercial software packages, such as a public domain product known as "Uncert," which is a freeware product developed by Bill Wingle, Dr. Eileen Poeter, and Dr. Sean McKenna.

In automated fitting, the concept would also be to fit a curve to the semi-variogram points, but the software would use some approximation of the function to produce the best fit. As illustrated in FIG. 2, for example, traditional automated-linear semi-variogram fittings are compared to each experimental semi-variogram for FIG. 1 in the display 200. The linear best-fit shown in FIG. 2, however, is not very good for most rigorous cases. In most automated cases, the approach requires some form of curve (non-linear) fitting method that is "blind" to the user. An approach is blind to the user when the user cannot give any input to the fit achieved by the automated function.

There is, therefore, a need for a variogram model that enables non-linear semi-variogram fitting, is not blind to the user and can be automated.

SUMMARY OF THE INVENTION

The present invention meets the above needs and overcomes one or more deficiencies in the prior art by providing systems and methods for computing a variogram model, which utilizes a variogram map (polar plot) and a rose diagram to compute the semi-variograms.

In one embodiment, the present invention includes a method for constructing a variogram model, which comprises i) identifying a maximum direction of spatial continuity using a variogram map; ii) displaying a rose diagram, the rose diagram comprising an edge and a plurality of vectors; iii) rotating only the edge of the rose diagram to align the maximum direction of spatial continuity with an axis of the rose diagram; and iv) adjusting the edge of the rose diagram using a graphical user interface until the edge of the rose diagram meets each end of each longest and shortest rose diagram vector.

In another embodiment, the present invention includes a non-transitory program carrier device tangibly carrying computer executable instructions for constructing a variogram model. The instructions are executable to implement: i) identifying a maximum direction of spatial continuity using a variogram map; ii) displaying a rose diagram, the rose diagram comprising an edge and a plurality of vectors; iii) rotating only the edge of the rose diagram to align the maximum direction of spatial continuity with an axis of the rose diagram; and iv) adjusting the edge of the rose diagram using a graphical user interface until the edge of the rose diagram meets each end of each longest and shortest rose diagram vector.

In yet another embodiment, the present invention includes a non-transitory program carrier device tangibly carrying a data structure stored thereon, the data structure comprising a data field, the data field comprising i) a rose diagram having a center, an axis and a plurality of vectors, the axis of the rose diagram being aligned with a maximum direction of spatial continuity on a variogram map and each end of each longest and shortest rose diagram vector meeting an edge of the rose diagram.

Additional aspects, advantages and embodiments of the invention will become apparent to those skilled in the art from the following description of the various embodiments and related drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

Method Description

Figure 1:
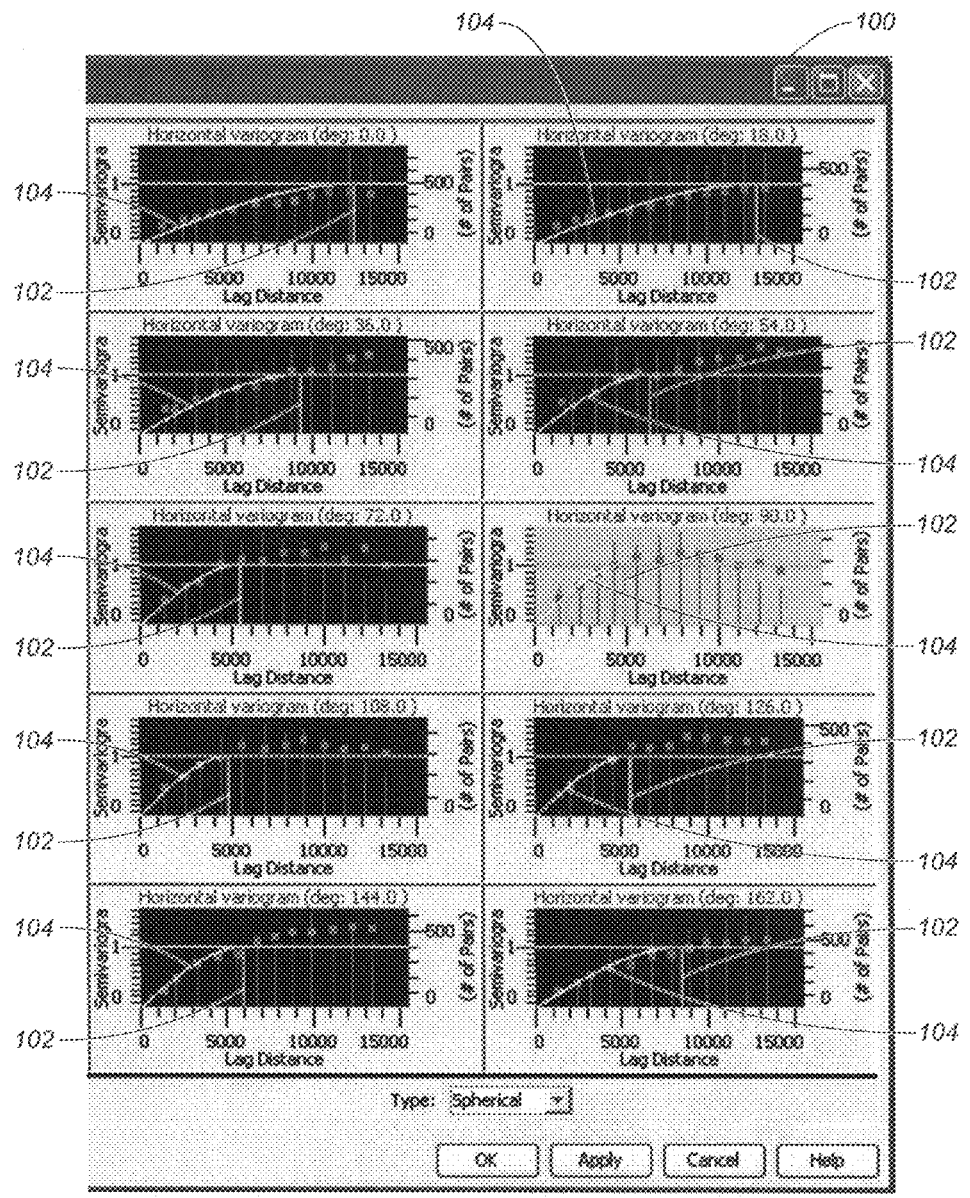
FIG. 1 illustrates traditional trial and error semi-variogram modeling using ten (10) experimental semi-variograms.
Figure 2:
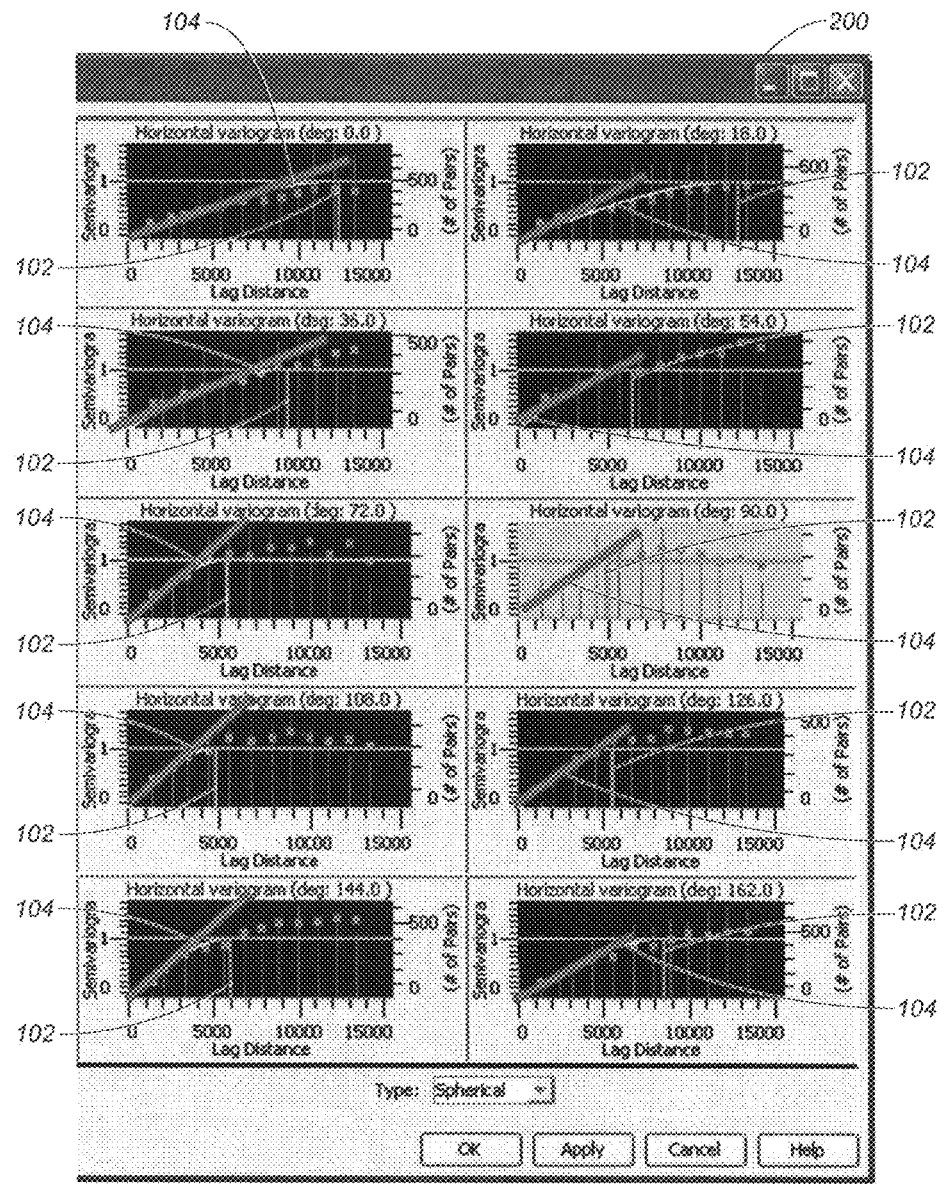
FIG. 2 illustrates traditional automated-linear semi-variogram fittings for each experimental semi-variogram in FIG. 1.
Figure 3:
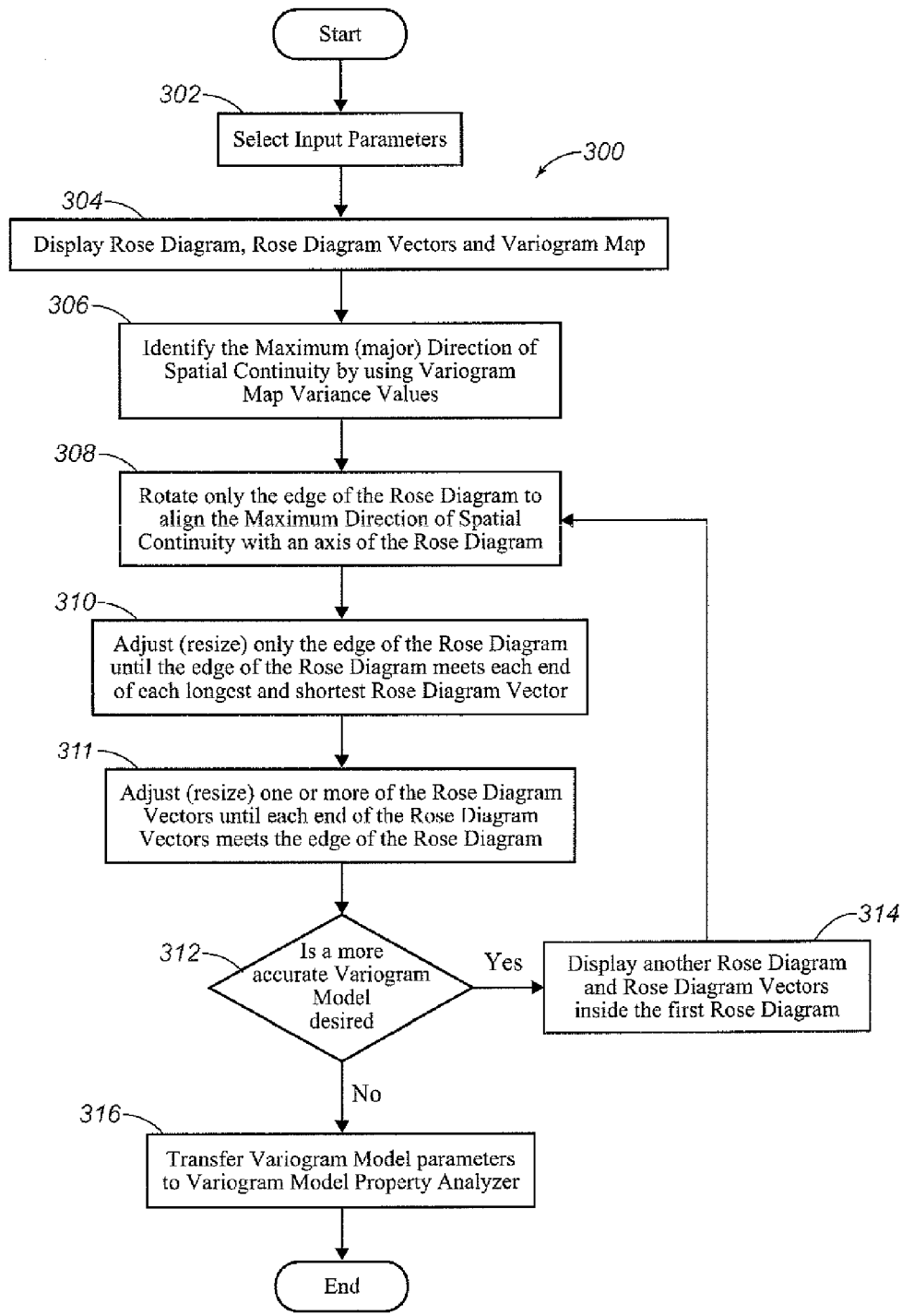
FIG. 3 is a flow diagram illustrating one embodiment of a method for implementing the present invention.

Referring now to FIG. 3, a flow diagram illustrates one embodiment of a method 300 for implementing the present invention.

In step 302, input parameters are selected using a graphical user interface and techniques well known in the art. The input parameters may be pre-selected as default settings.

In step 304, a rose diagram and variogram map are rendered and displayed using conventional graphic rendering techniques, which are well known in the art. The rose diagram and variogram map are automatically rendered using the input parameters. The variogram map is a polar plot comprising color-coded or gray-scale variance values, which are used to determine a maximum direction of spatial continuity among the data represented by the variogram map. The rose diagram includes an edge and a plurality of vectors, which extend radially away from a center of the rose diagram. The rose diagram and variogram map are preferably concentric. The rose diagram may be a circle with axes of equal length. Optionally, the rose diagram may be an ellipse comprising a major axis, a minor axis and intermediate axes. The variogram map variance values may be computed at specified distances (lag intervals, plus and minus a distance tolerance). The rose diagram represents the distances modeled on the semi-variograms computed along different azimuths. Each line of the rose diagram is the length of the spatial scale modeled on each semi-variogram along the various vectors (number of directions). The variogram map and rose diagram may be used as a graphical representation of the spatial continuity of reservoir properties or any regionalized attribute.

In step 306, the maximum (major) direction of spatial continuity on the variogram map is identified by using the variogram map variance values. The maximum direction of spatial continuity is typically identified as the direction in which the color-coded or gray-scale variance values change the least with distance (lag interval). The minimum (minor) direction of spatial continuity is typically identified as the direction in which the color-coded or gray-scale variance values change the most rapidly with distance, which is usually perpendicular to the maximum direction of spatial continuity.

In step 308, only the edge of the rose diagram is rotated to align the maximum direction of spatial continuity with an axis of the rose diagram using a graphical user interface and techniques well known in the art. If the rose diagram is an ellipse, then the maximum direction of spatial continuity is preferably aligned with the major axis of the rose diagram. If the longest and shortest rose diagram vectors represent the maximum and minimum directions of spatial continuity, respectively, then the rose diagram (ellipse) major and minor axes may be aligned with the longest and shortest rose diagram vectors.

In step 310, only the edge of the rose diagram is adjusted (resized) using a graphical user interface and techniques well known in the art until the edge of the rose diagram meets each end of each longest and shortest rose diagram vector. Adjusting the edge of the rose diagram therefore, may change the shape and size of the rose diagram. At this step, the variogram model may be complete or it may be refined and analyzed by one or more of the following steps.

In step 311, one or more of the rose diagram vectors may be adjusted (resized) until each end of the rose diagram vectors meets the edge of the rose diagram. In this step, each of the one or more rose diagram vectors may be displayed with a respective semi-variogram, which represents the spatial scale or continuity of the property for that vector and may be used to adjust the length of the vector. This step is preferably done without further adjusting the edge of the rose diagram.

In step 312, method 300 determines if a more accurate variogram model is desired. If the variogram model does not require further refinement, then the parameters for the variogram model may be transferred to a Variogram Model Property Analyzer as indicated in step 316. If, however, more accuracy is desired, then another rose diagram may be displayed inside the first rose diagram at step 314 and the method 300 is repeated for the another rose diagram beginning at step 308. In other words, the variogram model is "nested." This step allows for more accurate modeling of the near-origin portion of the variogram model.

The method 300 may also be automated, but is quite different than any other approach in that the method can fit nested models. The approach may be automated using a linear or non-linear authorized mathematical function. Authorization means that it is restricted to a small set of functions, which are well known in the art and insure positive-definiteness of the covariance matrix.

The method 300 therefore, intuitively improves the ability to model the scales and orientation of spatial continuity in the data. The method 300 is not blind to the user because it makes use of the variogram map, an associated rose diagram and several authorized model types such as, for example, spherical, cubic and exponential, for variogram modeling. As can be appreciated by those having ordinary skill in the art, the method 300 can be applied to one, two or three-dimensional data sets.

Figure 4A:
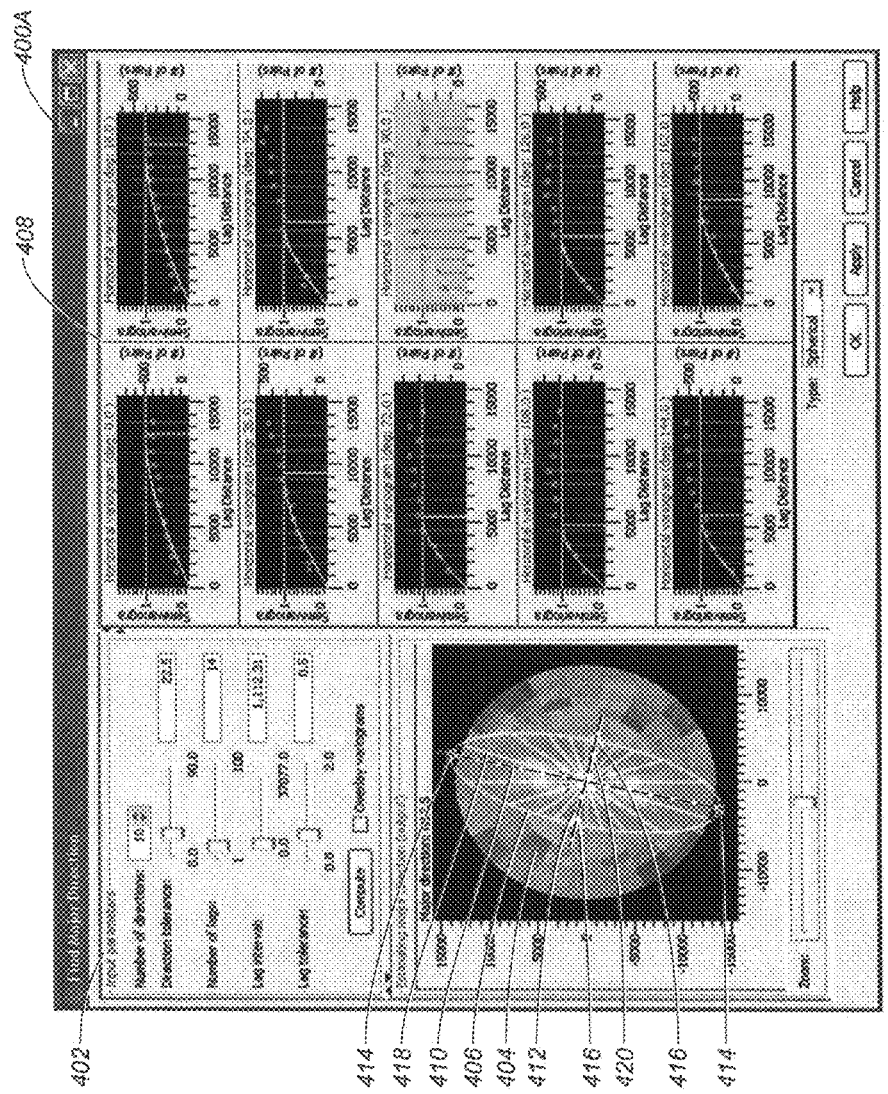
FIG. 4A illustrates the use of a variogram map and a rose diagram to compute a variogram model and its corresponding semi-variograms according to the method in FIG. 3.

Referring now to FIG. 4A, a conventional graphical user interface 400A illustrates the use of a variogram map and an elliptical rose diagram to intuitively compute a variogram model according to the method 300 in FIG. 3.

The user first selects the input parameters 402, which control the display of the variogram map 404, the rose diagram 406 and each rose diagram vector extending radially from a center of the rose diagram and the variogram map. The input parameters 402 also control the display of each of the ten (10) semi-variograms in the semi-variogram display 408, which represent the spatial scale or continuity of the property for that vector and may be used to adjust the length of the vector. The input parameters 402 may be pre-selected as default settings, which may vary depending on the data-set. Alternatively, the user may select the number of directions that will determine the number of rose diagram vectors and spacing. The "direction tolerance" is the angular tolerance in degrees along the search vector. The angular tolerance is determined by dividing the number of directions into 180 degrees. The "number of lags" specifies the number of points included in each semi-variogram. The "lag interval" determines the amount of spacing or distance between each data pair used to compute the variance, which is included in each point of the experimental semi-variogram. The user can select the default lag interval (the distance over which computations are made) or a customized lag interval based on experience. The "lag tolerance" is the proportion of the lag interval used in the computation of each corresponding semi-variogram.

Once the input parameters 402 are selected, the user selects "compute" and the program computes and displays the variogram map 404, the rose diagram 406, each rose diagram vector and each corresponding semi-variogram in the semi-variogram display 408. The rose diagram 406 and the variogram map 404 are preferably concentric. As illustrated by the rose diagram 406, there are ten (10) different vectors extending radially from a center of the rose diagram 400 and variogram map 404. Because the variogram map 404 represents the four quadrants of the possible experimental semi-variograms, the NE quadrant is a reversed mirror image of the SW quadrant and the same holds true for the NW and SE quadrants of the variogram map 404. Therefore, the 10 directions appear to be 20 vectors emanating from the center of the rose diagram 406. The length of each vector is related to the "scale" or distance from the y-axis to the position of the best fit on each corresponding semi-variogram in the semi-variogram display 408. In other words, the point at which each vector reaches horizontal (furthest point from the y-axis) on its corresponding semi-variogram corresponds with the edge of the rose diagram 406. Each semi-variogram in the semi-variogram display 408 represents a different direction and thus, a different orientation of the associated vector for the rose diagram 406.

On the variogram map 404, the maximum (major) direction of spatial continuity 410 is identified as the direction in which the color-coded or gray-scale variance values change the least. The minimum (minor) direction of spatial continuity 412 is identified as the direction in which the color-coded or gray-scale variance values change the most rapidly with distance, which is typically perpendicular to the maximum direction of spatial continuity 410.

The user rotates only the edge of the rose diagram 406 to align the maximum direction of spatial continuity 410 with a major axis of the rose diagram 406 by clicking on a handle 414 or 416 with a pointing device.

Once aligned, the user then adjusts (resizes) only the edge of the rose diagram 406, by using the handles 414 or 416 until the edge of the rose diagram 406 meets each end of each longest 418 and shortest 420 rose diagram vector. Adjusting the edge of the rose diagram 406 in this manner will also find the best fit curve for the semi-variograms in the semi-variogram display 408. Once the best fit is found, the variogram model may be complete. Optionally, one or more of the rose diagram vectors may be adjusted (resized) until each end of the rose diagram vectors meets the edge of the rose diagram 406. In this manner, the length of each rose diagram vector may be adjusted, without adjusting the edge of the rose diagram 406, using a corresponding semi-variogram in the semi-variogram display 408.

Figure 4B:
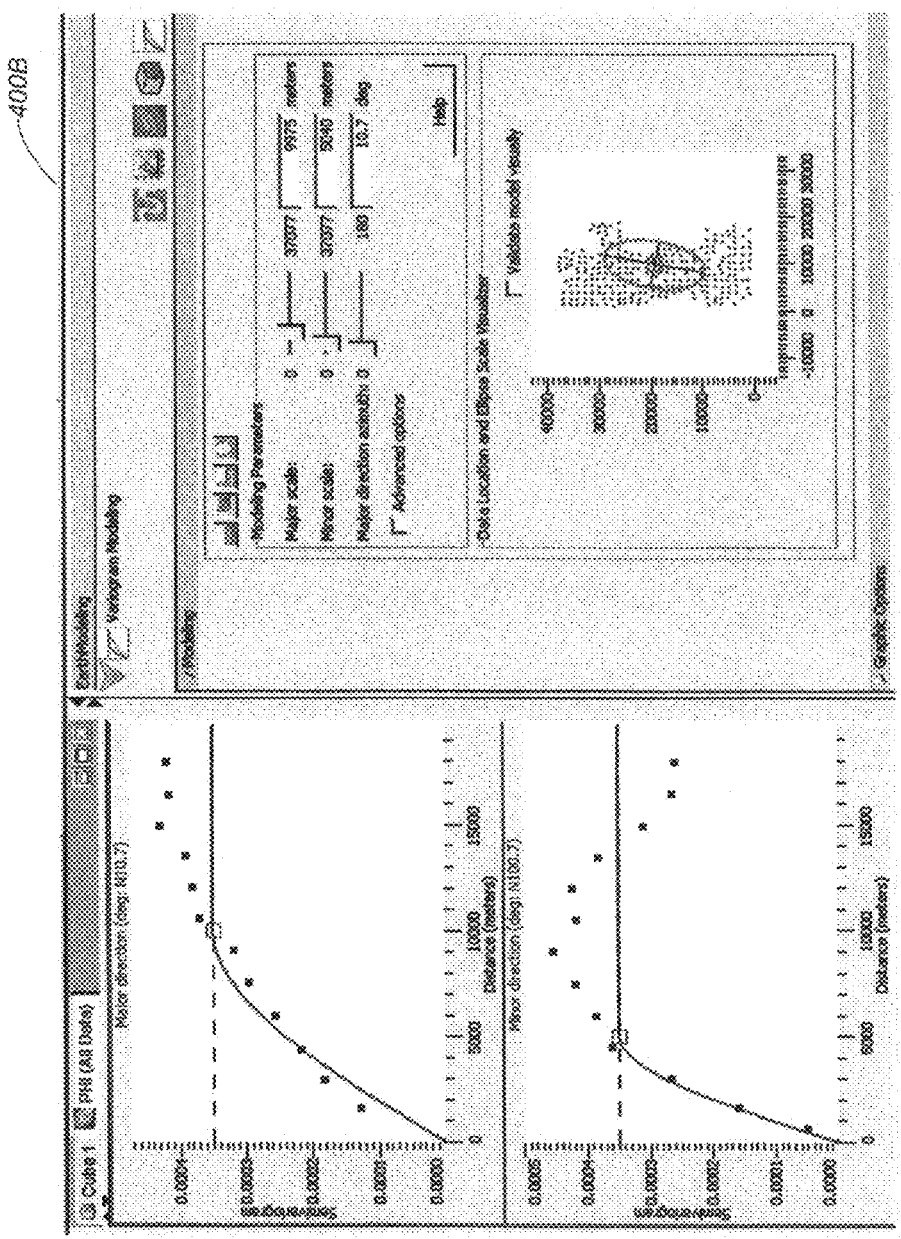
FIG. 4B illustrates the analysis of the variogram model using a semi-variogram for each major and minor direction of spatial continuity.

Once the variogram model is complete, the parameters for the model may be passed onto a Variogram Model Property Analyzer illustrated in FIG. 4B. In FIG. 4B, a conventional graphical user interface 400B illustrates the analysis of the variogram model using a semi-variogram for each major and minor direction of spatial continuity. The user interface 400B illustrates the semi-variograms computed for only the major and minor directions of continuity as determined from the use of the variogram map and rose diagram. The user has the option to accept the final fitted variogram model or can make manual adjustments until a satisfactory fit is achieved, using nested models if required. Once finalized, the variogram model is saved and can then be used to perform interpolation by kriging or conditional simulation, which are well known methods in the art.

System Description

The present invention may be implemented through a computer-executable program of instructions, such as program modules, generally referred to as software applications or application programs executed by a computer. The software may include, for example, routines, programs, objects, components, data structures, etc., that perform particular tasks or implement particular abstract data types. DecisionSpace, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks, such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. The present invention may therefore, be implemented in connection with various hardware, software or a combination thereof, in a computer system or other processing system.

Figure 5:
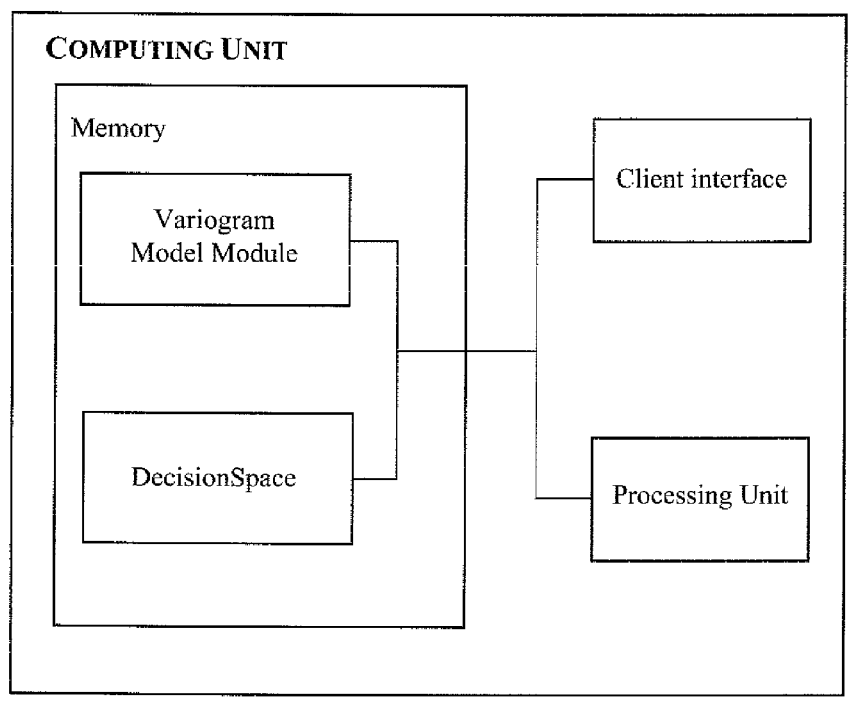
FIG. 5 is a block diagram illustrating one embodiment of a system for implementing the present invention.

Referring now to FIG. 5, a block diagram of a system for implementing the present invention on a computer is illustrated. The system includes a computing unit, sometimes referred to as a computing system, which contains memory, application programs, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIG. 3 and FIGS. 4A-4B.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above therefore provide storage and/or carry computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

The system and methods of the present invention therefore, improve the variogram model for global geostatistics/property modeling.

While the present invention has been described in connection with presently preferred embodiments, it will be understood by those skilled in the art that it is not intended to limit the invention to those embodiments. The present invention, for example, may be used with any type of data that is considered to be a regionalized variable or with any property that has spatial coordinates affiliated with a property measurement. Other industry applications therefore, may include i) environmental studies of trace metals, toxins; ii) mapping the quantity and quality of coal and its potential contaminants such as sulfur and mercury; iii) measuring signal strength in the cellular phone industry; iv) creating maps of aquifers; v) mapping soil patterns; and vi) analyzing and predicting rainfall using Doppler Radar and rainfall measurements.

It is therefore, contemplated that various alternative embodiments and modifications may be made to the disclosed embodiments without departing from the spirit and scope of the invention defined by the appended claims and equivalents thereof.

The invention claimed is:

1. A method for constructing a variogram model, which comprises:
    identifying a maximum direction of spatial continuity using a variogram map;
    displaying a rose diagram, the rose diagram comprising an edge and a plurality of vectors;
    rotating only the edge of the rose diagram to align the maximum direction of spatial continuity with an axis of the rose diagram; and
    adjusting the edge of the rose diagram using a graphical user interface until the edge of the rose diagram meets each end of each longest and shortest rose diagram vector.

2. The method of claim 1, wherein the rose diagram and variogram map are concentric.

3. The method of claim 2, wherein each of the plurality of rose diagram vectors extends radially away from a center of the rose diagram.

4. The method of claim 1, wherein the rose diagram is an ellipse comprising a major axis and a minor axis.

5. The method of claim 4, wherein the maximum direction of spatial continuity is aligned with the major axis of the rose diagram.

6. The method of claim 1, wherein the variogram map is a polar plot comprising variance values computed at specified distances, which are used to determine the maximum direction of spatial continuity.

7. The method of claim 1, further comprising adjusting one or more of the plurality of rose diagram vectors using a semi-variogram until each end of the plurality of rose diagram vectors meets the edge of the rose diagram without further adjusting the edge of the rose diagram.

8. The method of claim 1, further comprising:
    displaying another rose diagram inside the rose diagram, the another rose diagram comprising an edge and a plurality of vectors;
    rotating the edge of the another rose diagram to align the maximum direction of spatial continuity with an axis of the another rose diagram; and adjusting the edge of the another rose diagram until the edge of the another rose diagram meets each end of each longest and shortest another rose diagram vector.

9. The method of claim 1, further comprising selecting input parameters as default settings.

10. The method of claim 1, wherein adjusting the edge of the rose diagram changes a size and a shape of the rose diagram.

11. A non-transitory program carrier device tangibly carrying computer executable instructions for constructing a variogram model, the instructions being executable to implement:
identifying a maximum direction of spatial continuity using a variogram map;
displaying a rose diagram, the rose diagram comprising an edge and a plurality of vectors;
rotating only the edge of the rose diagram to align the maximum direction of spatial continuity with an axis of the rose diagram; and
adjusting the edge of the rose diagram using a graphical user interface until the edge of the rose diagram meets each end of each longest and shortest rose diagram vector.

12. The program carrier device of claim 11, wherein the rose diagram and variogram map are concentric.

13. The program carrier device of claim 12, wherein each of the plurality of rose diagram vectors extends radially away from a center of the rose diagram.

14. The program carrier device of claim 11, wherein the rose diagram is an ellipse comprising a major axis and a minor axis.

15. The program carrier device of claim 14, wherein the maximum direction of spatial continuity is aligned with the major axis of the rose diagram.

16. The program carrier device of claim 11, wherein the variogram map is a polar plot comprising variance values computed at specified distances, which are used to determine the maximum direction of spatial continuity.

17. The program carrier device of claim 11, further comprising adjusting one or more of the plurality of rose diagram vectors using a semi-variogram until each end of the plurality rose diagram vectors meet the edge of the rose diagram without further adjusting the edge of the rose diagram.

18. The program carrier device of claim 11, further comprising:
displaying another rose diagram inside the rose diagram, the another rose diagram comprising an edge and a plurality of vectors;
rotating only the edge of the another rose diagram to align the maximum direction of spatial continuity with an axis of the another rose diagram; and
adjusting the edge of the another rose diagram until the edge of the another rose diagram meets each end of each longest and shortest another rose diagram vector.

19. The program carrier device of claim 11, further comprising selecting input parameters as default settings.

20. The program carrier device of claim 11, wherein adjusting the edge of the rose diagram changes a size and a shape of the rose diagram.

21. A non-transitory program carrier device tangibly carrying a data structure stored thereon, the data structure comprising a data field, the data field comprising:
a rose diagram having a center, an axis and a plurality of vectors, the axis of the rose diagram being aligned with a maximum direction of spatial continuity on a variogram map and each end of each longest and shortest rose diagram vector meeting an edge of the rose diagram.

22. The program carrier device of claim 21, wherein each of the plurality of rose diagram vectors extends radially away from the center of the rose diagram.

23. The program carrier device of claim 21, wherein the rose diagram is an ellipse comprising a major axis and a minor axis.

24. The program carrier device of claim 23, wherein the maximum direction of spatial continuity is aligned with the major axis of the rose diagram.

25. The program carrier device of claim 21, wherein the variogram map is a polar plot comprising variance values computed at specified distances, which are used to determine the maximum direction of spatial continuity.

26. The program carrier device of claim 21, wherein each end of the plurality of rose diagram vectors meets the edge of the rose diagram.

27. The program carrier device of claim 21, further comprising another data field, the another data field comprising:
another rose diagram inside the rose diagram, the another rose diagram having the center, an axis and a plurality of vectors, the axis of the another rose diagram being aligned with the maximum direction of spatial continuity and each end of each longest and shortest another rose diagram vector meeting an edge of the another rose diagram.

* * * * *